May 8, 1945. A. PIZZIGONI 2,375,323
SURFACE AND CONTOUR GRINDER
Filed Feb. 19, 1944 5 Sheets-Sheet 1

Inventor
Alfred Pizzigoni

By Clarence A. O'Brien
and Harvey B. Jacobson
Attorneys

May 8, 1945.  A. PIZZIGONI  2,375,323
SURFACE AND CONTOUR GRINDER
Filed Feb. 19, 1944   5 Sheets-Sheet 2
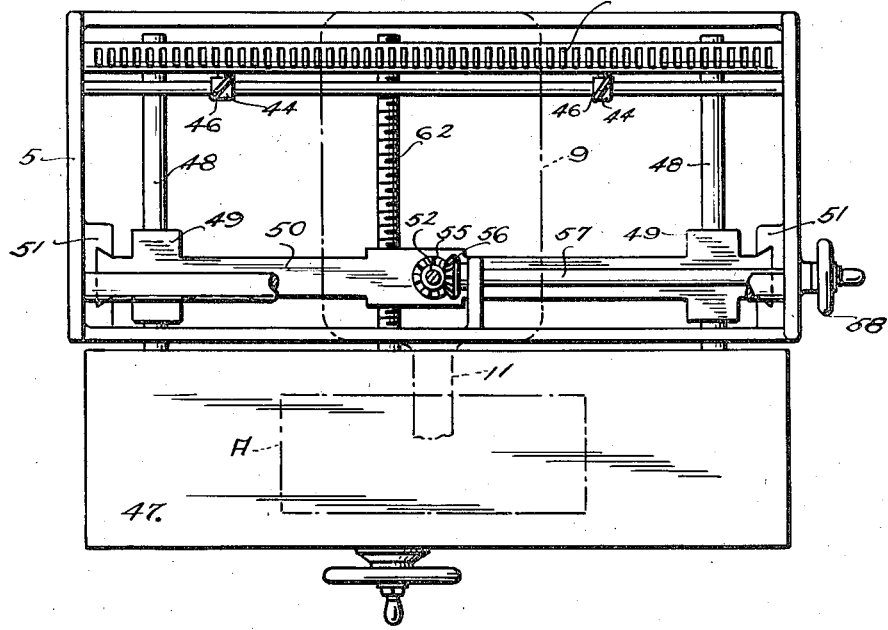
Inventor
Alfred Pizzigoni
By Clarence A. O'Brien
and Harvey B. Jacobson
Attorneys Inventor
Alfred Pizzigoni May 8, 1945. A. PIZZIGONI 2,375,323
SURFACE AND CONTOUR GRINDER
Filed Feb. 19, 1944 5 Sheets-Sheet 4
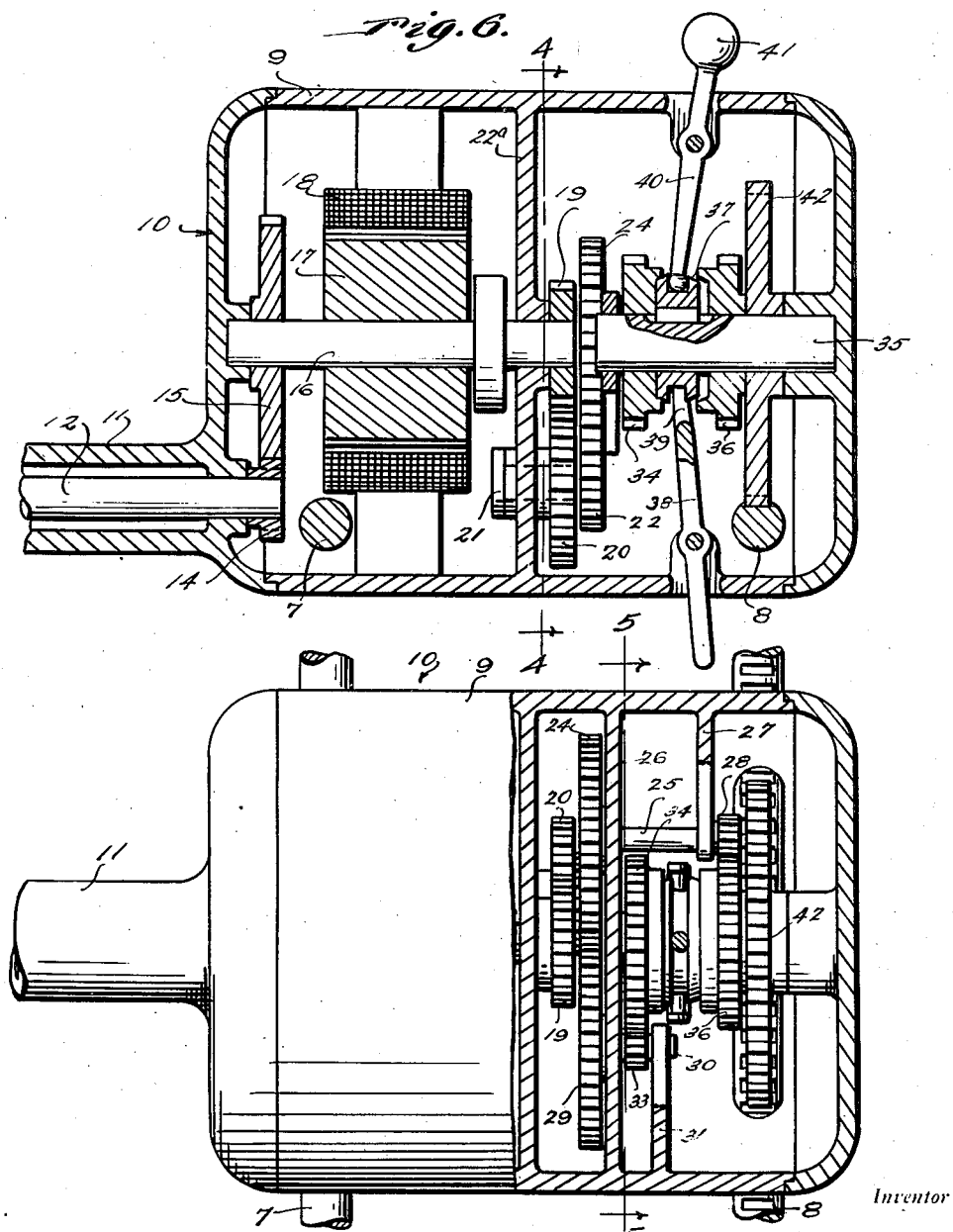
Inventor
Alfred Pizzigoni
By Clarence A. O'Brien
and Harvey B. Jacobson
Attorneys

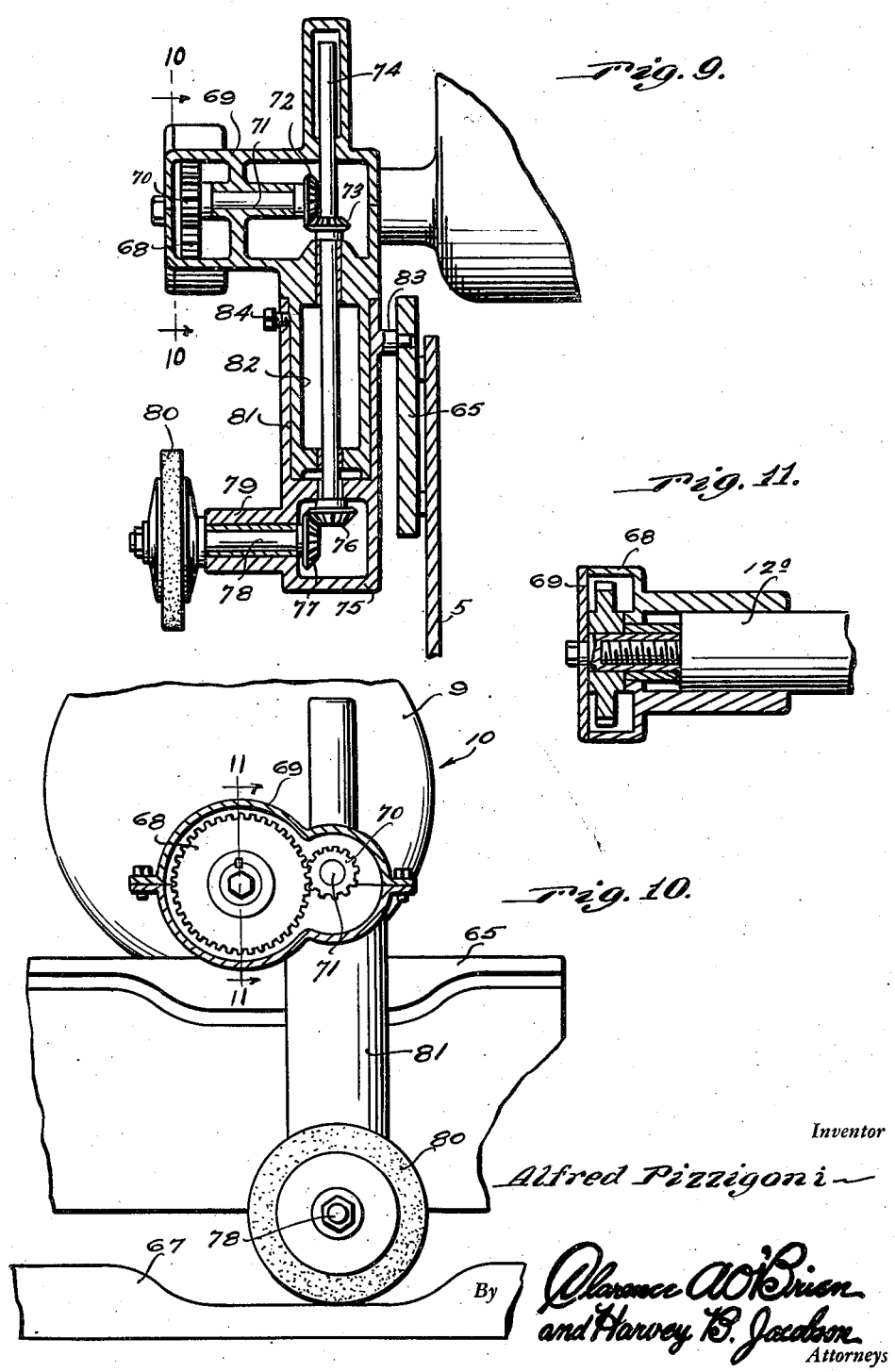

Patented May 8, 1945

2,375,323

UNITED STATES PATENT OFFICE 2,375,323

SURFACE AND CONTOUR GRINDER

Alfred Pizzigoni, Union City, N. J.

Application February 19, 1944, Serial No. 523,136

4 Claims. (Cl. 51—34)

This invention relates to new and useful improvements in grinding machines, the principal object of the invention being to provide a grinding machine wherein the grinder itself reciprocates, instead of the table, which is usually the medium of operation, this with a view toward utilizing the grinder element for contour grinding.

Another important object of the invention is to provide a grinder which can be used either for surface or contour grinding and wherein adjustability can be accomplished to take care of various contingencies and requirements.

Other objects and advantages of the invention will become apparent to the reader of the following description.

In the drawings:

Figure 2 is a top plan view with the cover, motor and certain other elements removed.

Figure 5 is a cross sectional view taken substantially on the 5—5 of Figure 7.

Figure 6 is a fragmentary longitudinal sectional view through the motor and clutch unit.

Figure 7 is a fragmentary detailed sectional view, looking downwardly, on the motor and clutch unit.

Figure 9 is a fragmentary vertical sectional view through a modified form adapted for contour grinding.

Figure 10 is a fragmentary detailed sectional view taken substantially on the line 10—10 of Figure 9.

Figure 11 is a sectional view taken substantially on the line 11—11 of Figure 10.

Figure 1:
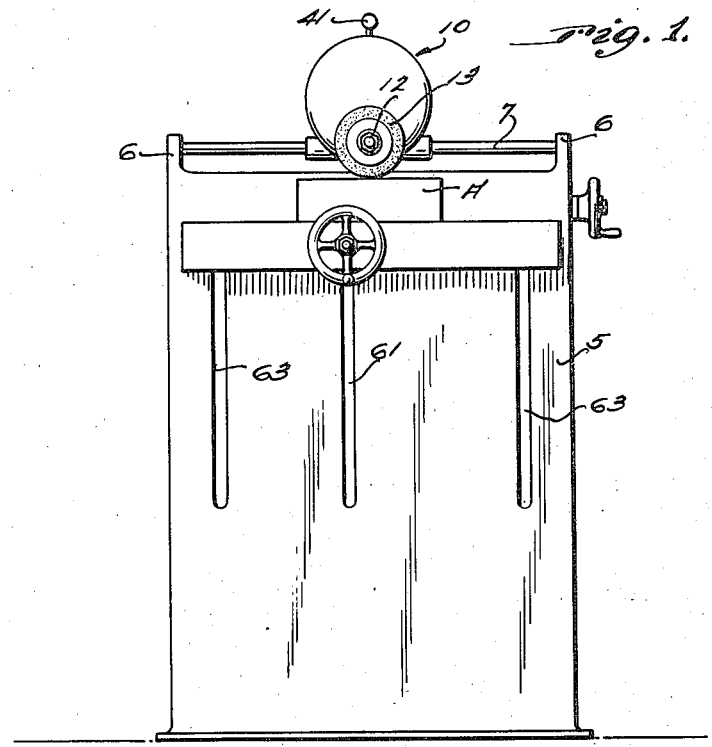
Figure 1 represents a front elevational view of the machine.

Referring to the drawings wherein like numerals designate like parts, it can be seen that numeral 5 denotes a vertically disposed shell suitably supported upon a base or foundation. The top of this shell 5 has short upstanding end walls 6, 6 between which extends a guide bar 7 and a rack bar 8. These bars 7, 8 extend through a housing 9 of a motor and clutch unit generally referred to by numeral 10, which housing has a barrel 11 projecting forwardly therefrom and through which a driven shaft 12 is disposed and equipped at its outer end with a grinding wheel 13.

Here it will be understood, that the unit 10 is to reciprocate back and forth on the bars 7 and 8 in straight surface grinding operation.

The inner end of the shaft 12 carries a pinion 14 which meshes with a gear 15 on a drive shaft 16. The drive shaft 16 is in fact an armature shaft, having an armature 17 thereon in electromagnetic relation with respect to a field 18, these parts going together to make up an electric motor.

The inner end of the shaft 16 carries a pinion 19 which meshes with an underlying gear 20 located on a stub shaft 21 supported by a vertical partition 22a in the housing 9.

Figure 4:
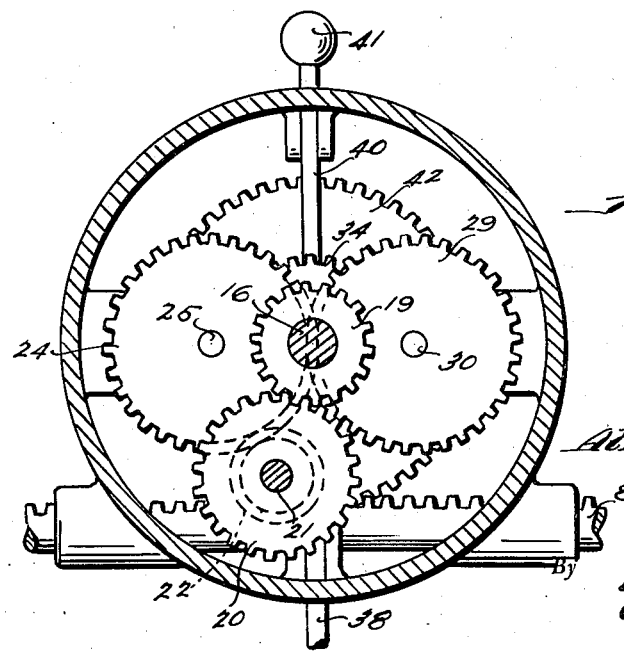
Figure 4 is a vertical sectional view taken substantially on the line 4—4 of Figure 6.

As shown in Figure 4, on the shaft 21 is a pinion 22 meshing with a gear 24 located on a shaft 25, this shaft being disposed through support 26, 27, and having a pinion 28, at its rear end. The gear 24 meshes with a second gear of equal size and denoted by numeral 29, located on a shaft 30 disposed through the supports 26 and 31. At the rear end of the shaft 30 is a pinion 33 and this meshes with a gear 34 located to rotate on the shaft 35. There is a second gear 36 on the shaft 35 with which meshes the pinion 28. This gear 36 is also free to rotate on the shaft 35 when not engaged by a clutch element 37 which is keyed to the shaft 35 and is operated by a rockable finger 38, the same having a yoke 39 at its upper end engaging in the circumferential groove of the clutch element 37.

A detent for the clutch element 37 consists of a vertically disposed and pivoted arm 40 having its lower end engaged into the circumferential groove of the clutch element 37, while its upper end projects through an opening in the housing 9 and is equipped with a ball or weighed head 41. Obviously, by actuating this head 41, the clutch can be controlled manually.

Keyed to the clutch shaft 35 is a gear 42 which meshes with the rack bar 8.

Secured at predetermined points on a carrier rod 43 located horizontally within the shell 5 are collars 44 secured in place by wing screws 45 and these have angularly set plates or cams 46 thereon for the purpose of deflecting the lower ends of the finger 38 to reverse the clutch mechanism, thus resulting in reversed operations of the drive to the rack bar 8, when operating against work A located on an adjustable table 47. The table 47 is supported by bars 48 slidably disposed through heads 49 of an elongated block 50 which has its end portions dovetailed and slidable in guides 51 secured to the inside of the shell 5.

A vertically disposed screw-shaft 52 has its upper and lower ends journaled in bearings 53, 54, the upper portion of this shaft 52 being equipped with a beveled gear 55 meshing with a bevel gear 56 on a horizontal shaft 57 which extends through one end of the shell 5 and there equipped with a hand wheel 58. The screw 52 extends downwardly through the block 50, the block being provided with nut structures 59. Thus by rotating the hand wheel 58, the block 50 can be vertically adjusted for elevating and lowering the table 47.

The table 47 has a shaft 60 journaled horizontally therethrough and this extends through a vertical slot 61 in the front of the shell 5 and is threaded as at 62 for feedable disposition through the block 50. Thus the table 47 is horizontally adjustable.

The guide bars 48 extending from the table 47 extend through vertical slots 63 in the front wall of the shell 5.

Thus it can be seen that instead of the table reciprocating as in most surface grinders, the grinder and motive means reciprocate in the present invention, and this is principally so that the means for contour grinding can be readily associated with this above described machine.

Now, concerning the means for adapting the present machine to contour grinding, Figures 9 to 12, should be inspected.

Figure 12:
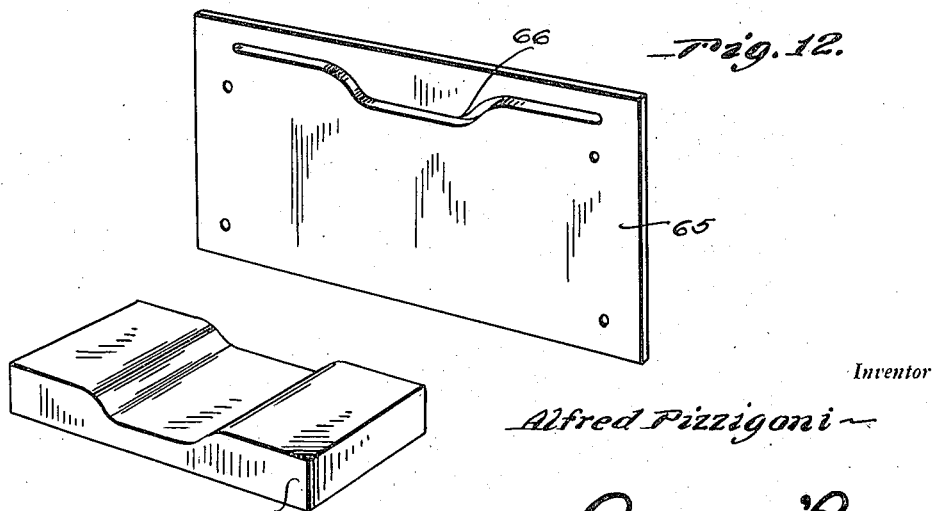
Figure 12 is a perspective view of a pattern or form plate shown in corresponding position to a piece of work defined thereby.
Figure 3:
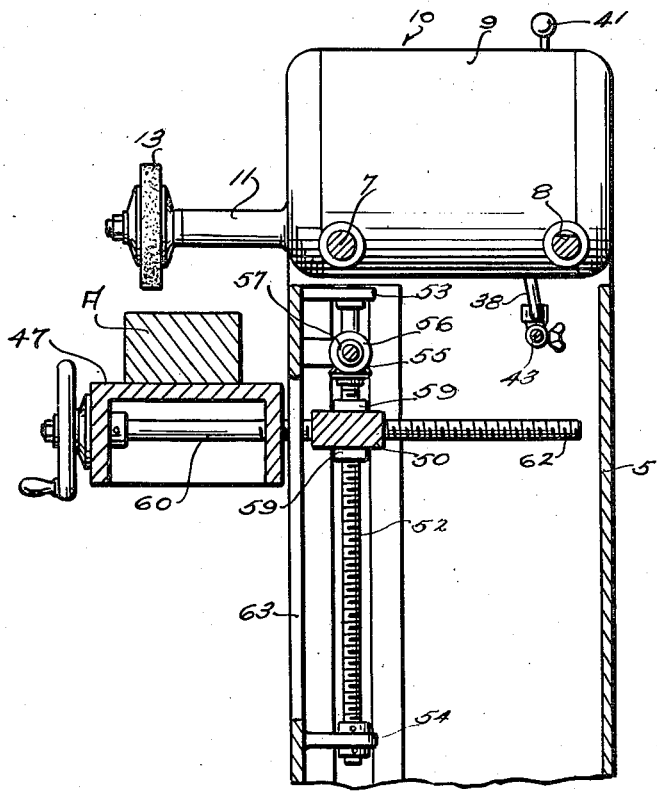
Figure 3 is a fragmentary vertical sectional view through the machine.
Figure 8:
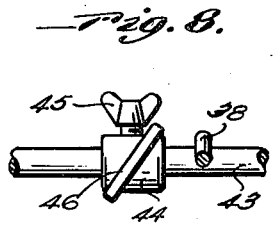
Figure 8 is an elevational view of one of the clutch operating cams.

In contour grinding, it is necessary to use a form or pattern plate such as shown in Figure 12 and denoted by reference character 65. This plate has a slot 66 therein conforming with the form of cut desired. In Figure 12, a piece of work 67 is shown after having been ground by the contour grinding means shown in Figures 9, 10 and 11 in conjunction with the pattern plate 65.

In carrying out the present invention insofar as the contour grinding feature is concerned, it can be seen that the pattern plate 65 is mounted on the upper portion of the front wall of the shell 5. Instead of the wheel 13 at the outer end of the shaft 12 the shaft 12a in the present adaptation of the device carries a gear 68 operating within a housing 69. The gear 68 meshes with a pinion 70 within this housing 69, the pinion 70 being located on a shaft 71, the same projecting inwardly and being equipped with a beveled gear 72 and meshing with a beveled gear 73 through which a vertical shaft 74 is slidable. The shaft 74 extends downwardly into a box 75 where it is equipped with a beveled gear 76 meshing with a beveled gear 77 on a short horizontal shaft 78 which extends through a barrel 79 projecting forwardly from the box 75 and carried by this short shaft 78 is a grinding wheel 80.

Rising from the box 75 is a sleeve 81 which telescopes a barrel 82 depending from the inner end of the housing 69. A boss 83 projects rearwardly from the sleeve 81 and into the slot 66 of the pattern plate 65. Obviously, the sleeve 81 is free to move up and down on the barrel 82 as guided by the form or pattern plate 65 and the disposition of the grinding wheel 80 is responsive to this action. The sleeve 81 may be provided with a set screw 84 for securing the sleeve 81 to the barrel 82 when the contour grinding attachment is to be demounted from the machine.

Obviously, as the grinder and the motor unit travel back and forth on the bars 7 and 8, the sleeve 81 will be elevated and lowered by the guiding action of the form or pattern plate 65 with respect to the boss 83, with the result that the grinder wheel 80 will be raised and lowered to conformingly act on the work, as for instance, the work 67 in Figure 12.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A grinding machine comprising a table, a motor unit including a casing, a grinder operated by the motor unit, means to mount said unit for reciprocation alongside said table comprising a pair of guide bars slidably extended through said casing and supporting the same, one of said bars being toothed, said motor unit including a drive gear meshing with the toothed bar, said motor unit including a clutch in said casing reciprocating with said unit and for reversing the drive to the gear.

2. A grinding machine comprising a table, a motor unit, a grinder operated by the motor unit, and means for adjusting the table including a horizontal carriage bar slidably mounted at its ends for vertical adjustment, a pair of horizontal table-supporting bars slidably extended transversely through said carriage bar adjacent opposite ends of the carriage bar, a screw feed shaft threaded transversely through the carriage bar intermediate the table-supporting bars, a second screw feed shaft extended vertically and centrally through said carriage bar, and an operating shaft for the second screw feed shaft geared thereto.

3. A grinding machine comprising a table, a motor unit, a grinder operated by the motor unit, said motor unit being mounted for reciprocation with respect to the table in an invariable horizontal path, said grinding element being adapted to freely move vertically and reciprocating with said motor unit, a form plate including a form slot, said grinder being provided with a stud disposed into the slot, said slot and stud coacting when the grinder reciprocates to move said grinder vertically.

4. A contour grinding machine comprising a motor unit mounted to reciprocate in an invariable horizontal path, a table, a stationary pattern plate, a vertically movable grinder unit reciprocating with the motor unit, drive means between the motor unit and the grinder unit, said grinder unit being provided with a portion coacting with the pattern plate to move said grinder unit vertically when the grinder unit reciprocates.

ALFRED PIZZIGONI.